United States Patent
Nordstrøm

(10) Patent No.: US 12,264,696 B2
(45) Date of Patent: Apr. 1, 2025

(54) CLIP FOR REMOVABLY SECURING A DEVICE TO A PLURALITY OF STRAPS

(71) Applicant: FalCom A/S, Ballerup (DK)

(72) Inventor: Morten Nordstrøm, Herlev (DK)

(73) Assignee: FalCom A/S, Ballerup (DK)

( * ) Notice: Subject to any disclaimer, the term of this patent is extended or adjusted under 35 U.S.C. 154(b) by 35 days.

(21) Appl. No.: 18/116,043

(22) Filed: Mar. 1, 2023

(65) Prior Publication Data
US 2023/0313821 A1 Oct. 5, 2023

(30) Foreign Application Priority Data
Mar. 31, 2022 (DK) .......................... PA 2022 70153

(51) Int. Cl.
*F16B 2/24* (2006.01)
*A45F 5/02* (2006.01)

(52) U.S. Cl.
CPC .............. *F16B 2/245* (2013.01); *A45F 5/02* (2013.01)

(58) Field of Classification Search
CPC .. F16B 2/245; F16B 2/241; A45F 5/02; A44B 11/28; A44B 13/00; Y10T 24/1394
See application file for complete search history.

(56) References Cited

U.S. PATENT DOCUMENTS

| | | | | | |
|---|---|---|---|---|---|
| 1,206,074 | A | * | 11/1916 | Zwiener et al. | A44B 15/002 24/3.12 |
| 1,281,656 | A | * | 10/1918 | Raschick | A45F 5/02 24/3.12 |
| 4,050,187 | A | * | 9/1977 | Geiger | F16B 45/036 24/339 |
| 4,475,676 | A | * | 10/1984 | Smith | A63B 57/00 24/3.12 |
| D315,669 | S | * | 3/1991 | Paul | D8/367 |
| D338,048 | S | * | 8/1993 | Finley | D3/320 |
| 5,572,793 | A | | 11/1996 | Collins et al. | |

(Continued)

FOREIGN PATENT DOCUMENTS

| | | |
|---|---|---|
| AU | 2019201823 A1 | 10/2019 |
| EP | 3 785 567 A1 | 3/2021 |

OTHER PUBLICATIONS

Extended European Search Report for EP Patent Appln. No. 23166055.6 dated Aug. 24, 2023.

(Continued)

*Primary Examiner* — Robert Sandy
*Assistant Examiner* — Rowland Do
(74) *Attorney, Agent, or Firm* — Vista IP Law Group, LLP

(57) ABSTRACT

A clip for removably securing a device to straps, includes: a main part having a first main part, a second main part, and an intermediate part, the main part configured to couple to the device; a first hook part at a first end of the main part, the first hook part having a first front facing towards a first surface of the main part; and a second hook part at a second end of the main part, the second hook part having a second front facing towards a second surface of the main part; wherein the first front overlaps with less than or equal to 75% of a length of the main part, wherein the second front overlaps with less than or equal to 25% of the length of the main part; and wherein the first main part and the second main part are offset relative to each other.

22 Claims, 6 Drawing Sheets

(56) References Cited

U.S. PATENT DOCUMENTS

| | | | | |
|---|---|---|---|---|
| 5,619,774 | A * | 4/1997 | Perry | A45F 5/02 24/336 |
| 6,199,733 | B1 * | 3/2001 | Reynolds, III | A45F 5/02 24/581.1 |
| 6,484,365 | B1 * | 11/2002 | Thompson | B60J 3/0204 24/3.12 |
| 8,079,503 | B1 | 12/2011 | Yeates et al. | |
| D789,190 | S | 6/2017 | Vermillion | |
| 10,499,724 | B2 * | 12/2019 | Hyson | A45F 5/021 |
| 2003/0229971 | A1 * | 12/2003 | Coyne | A45F 5/02 24/3.3 |
| 2005/0045685 | A1 * | 3/2005 | Sesto | A45F 5/02 224/269 |
| 2007/0193007 | A1 * | 8/2007 | Otrusina | A45F 5/02 24/572.1 |
| 2007/0289045 | A1 | 12/2007 | Evans et al. | |
| 2008/0178976 | A1 | 7/2008 | Lakhiani | |
| 2012/0175391 | A1 | 7/2012 | Rogers et al. | |
| 2015/0201725 | A1 * | 7/2015 | Kljajic | A45C 13/00 248/229.16 |
| 2016/0143425 | A1 | 5/2016 | Tvrdy | |
| 2019/0061190 | A1 | 2/2019 | Dobbs | |

OTHER PUBLICATIONS

"12pcs Webbing Ending Clip Adjust Keeper Buckle Connect Quick Slip Keeper for Molle Webbing Buckle Strap Belt Tactical Backpack Belt (2 inch (50mm))", Amazon.com, screen captured on Sep. 2, 2021.

"Zak Tool ZT52 Tactical Stealth Police Key Ring Holder (2.25-Inch Max)", Amazon.com, screen captured on Sep. 2, 2021.

"Molle-Clip Universal Molle / PALS Mounting System," DLP Tactical, Copyright 2021.

1st Technical Examination for Danish Patent Appln. No. PA 2022 70153 dated Jun. 22, 2022.

* cited by examiner

CLIP FOR REMOVABLY SECURING A DEVICE TO A PLURALITY OF STRAPS

RELATED APPLICATION DATA

This application claims priority to, and the benefit of, Danish Patent Application No. PA 2022 70153 filed on Mar. 31, 2022. The entire disclosure of the above application is expressly incorporated by reference herein.

FIELD

The present disclosure pertains to the field of modular gear components. In particular the present disclosure relates to a clip for securing a device to a plurality of straps, such as to a grid of load bearing webbing, of a load bearing platform.

BACKGROUND

A Pouch Attachment Ladder System (PALS) is a grid of webbing used to attach smaller equipment onto load-bearing platforms, such as vests and/or backpacks. The PALS may be used to attach items such as holsters, magazine pouches, radio pouches, knife sheathes, and other gear. A wide variety of pouches are commercially available, allowing users to customize their kit. PALS consists of a webbing sewn onto a load-bearing equipment and corresponding webbing and straps on the attachment. Typically, Modular Lightweight Load-carrying Equipment (MOLLE) clips are used to attach the equipment to the PALS webbing.

However, when equipment is attached on PALS webbing with known MOLLE clips, the MOLLE clip may bend out of shape and/or deform if the equipment is subjected to an excessive outward going force facing away from the user. This can lead to the attached equipment losing its intended position close to the PALS webbing, and interfering with other equipment attached on the PALS webbing, like magazines, pouches, radios, etc. This may lead to the user being prevented from using the equipment as intended. In worst case the user may lose the attached equipment.

SUMMARY

Accordingly, there is a need for a securing solution, which mitigate, alleviate or address the shortcomings existing and provides a clip which is less likely to deform and or lose its intended position.

Disclosed is a clip for removably securing a device to a plurality of straps. The clip comprises a main part having a first surface and an opposite second surface, a first main part end and a second main part end. The main part comprises a mounting part configured to mount the clip to a device to be secured to the plurality of straps. The clip comprises a first hook part arranged at the first main part end, the first hook part comprises a first front, the first front optionally arranged on a first side of the main part. The clip comprises a second hook part arranged at the second main part end, the second hook part comprising a second front. The second front is optionally arranged on a second side of the main part opposite the first side. The first hook end may partly overlap with the main part, for example the first hook end may overlap with less than or equal to 75% of a length of the main part. The second hook end may partly overlap with the main part, for example the second hook end may overlap with less than or equal to 25% of the length of the main part.

It is an advantage of the present disclosure that the clip is configured to attach to two individual straps on the PALS webbing. By having two hook parts configured to respectively retain a respective strap of the two individual straps, the bending torque of a force applied to the equipment is distributed to two ends of the clip. This prevents the clip from bending and will keep the attached equipment in its intended position, when subjecting the equipment to the same force. The clip according to the current disclosure prevents the attached equipment from losing its intended position close to the PALS webbing. By providing the clip with two hook parts at opposite ends of the clip, the clip according to the current disclosure is more durable than traditional clips.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
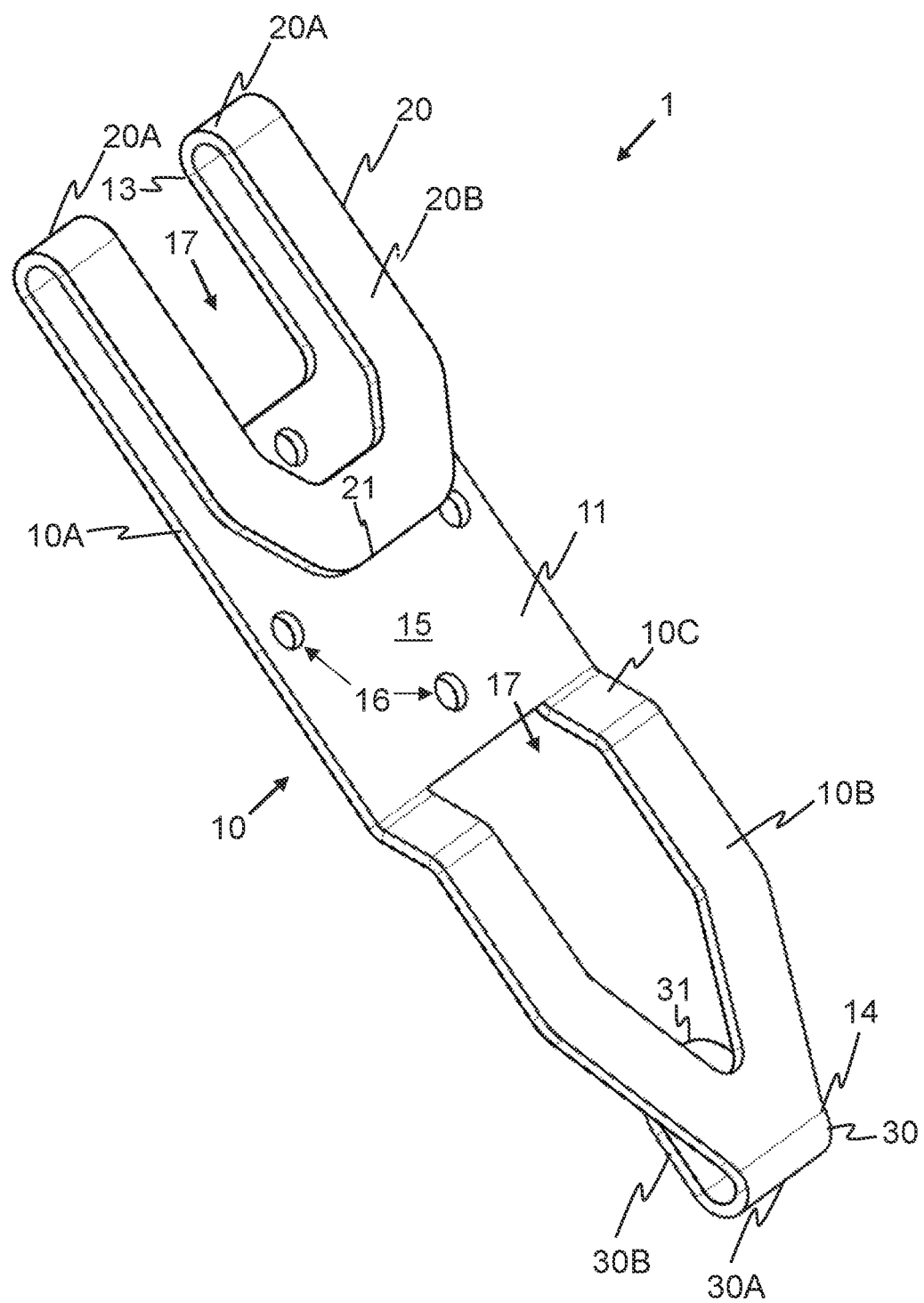
FIG. 1 illustrates an example clip according to this disclosure seen in a perspective view.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The current disclosure relates to a clip for removably securing a device to a plurality of straps.

The clip comprises a main part having a first surface and an opposite second surface, a first main part end and a second main part end. The first surface may connect the first main part end and the second main part end. The second surface may connect the first main part end and the second main part end. The first surface and the second surface being arranged on opposing sides of the main part.

The main part comprises a mounting part configured to mount the clip to a device, such as a communication device, a holster, a magazine pouch, a radio pouch, a knife sheath, and/or other gear, to be secured to the plurality of straps.

The clip comprises a first hook part arranged at the first main part end of the clip. A hook part herein means a piece of material curved or bent back at an angle, for catching hold of or hanging things on. The first hook part comprises a first hook end, a first bend and a first front. The first front is arranged between and connects a first end of the first bend with the first hook end. A second end of the first bend is connected to the main part of the clip. The main part may thereby constitute a shank of the first hook part. The first front and/or the first hook end is arranged on a first side of the main part. The clip comprises a second hook part arranged at the second main part end of the clip. The second hook part comprises a second hook end, a second bend, and a second front. The second front is arranged between and connects a first end of the second bend with the second hook end. A second end of the second bend is connected to the main part of the clip. The main part may thereby constitute a shank of the second hook part. The first front may partly overlap with the main part, for example the first front may overlap with less than or equal to 75% of a length (L) of the main part. The second front may partly overlap with the main part, for example the second front may overlap with less than or equal to 25% of the length of the main part. The length herein means the extension in a longitudinal direction of the clip, such as in a direction extending from the first main part end to the second main part end of the main part. The length L of the main part may be selected to cover two adjacent straps of the load bearing webbing, such as of the PALS webbing. In one or more example clips, the length of the main part is in the range of 75-90 mm, such as in the range of 79-82 mm, such as 80 mm. In one or more example clips, a length of the first front of the first hook part may be in the range of 0.1 L-0.7 L, such as in the range of 0.2-0.5 L. In one or more example clips, the length of the first front may be in the range of 8-60 mm, such as in the range of 20-40 mm, such as in the range of 25-35 mm, such as in the range of 29-31 mm. In one or more example clips, a length of the second front of the second hook part may be in the range of 0.05 L-0.25 L, such as in the range of 0.1-0.2 L. In one or more example clips, the length of the second front may be in the range of 4-20 mm, such as in the range of 7-15 mm. The first hook part may be configured to be arranged on a first side of a first strap of a load bearing webbing, such as on an inside of the strap, when the load webbing is worn by a user. The inside of the strap herein means the side of the strap facing a base plate of the load bearing webbing. The second hook part may be configured to be arranged on a second side of a second strap of the load bearing webbing, such as on an outside of the strap, when the load bearing webbing is worn by the user. The outside of the strap herein means the side of the strap facing away from the base plate of the load bearing webbing. The clip is configured to receive the straps between the main part and the first front of the first hook part and the second front of the second hook part. The main part may thus be arranged on the second side, such as on the outside, of the first strap and on the first side, such as on the inside, of the second strap of the load bearing webbing. The movement of the second main part end of the clip when a force is applied to a device mounted on the clip can thus be limited by the second strap being arranged on the outside of the main part of the clip.

In one or more example clips, the clip comprises a main part having a first surface and an opposite second surface, a first main part end and a second main part end, the main part comprising a mounting part configured to mount the clip to a device to be secured to the plurality of straps, the clip comprising a first hook part arranged at the first main part end, the first hook part comprising a a first front, the first front arranged on a first side of the main part, the clip comprising a second hook part arranged at the second main part end, the second hook part comprising a second front, the second front arranged on a second side of the main part opposite the first side, wherein the first front overlaps with less than or equal to 75% of a length of the main part and the second front overlaps with less than or equal to 25% of the length of the main part.

In one or more example clips, the first front of the first hook part extends parallel to the first surface, such as to the first surface of the main part. The first hook part may be bent towards the first surface, such that the first front faces the first surface of the main part. A first gap is thus created between the first surface of the main part and the first front of the first hook part for receiving a first strap. The first gap has a first throat, such as a distance from the first hook end to a centre of the first bend of the first hook. In one or more example clips, the second front of the second hook part extends parallel to the second surface. The second hook part may be bent towards the second surface, such that the second front faces the second surface of the main part. A second gap is thus created between the second surface of the main part and the second front of the second hook part for receiving a second strap. The second gap has a second throat, such as a distance from the second hook end to a centre of the second bend of the second hook. In other words, the first hook part may be arranged on a first side of the main part and the second hook part may be arranged on the second side of the main part of the clip. This allows the first and the second hook part to catch and/or retain a respective strap of the load bearing webbing, such as a respective strap of a PALS webbing, thereby securing both ends of the clip to the load bearing webbing. By securing the first and the second end of the clip to the load bearing webbing, the bending force applied to the clip by an outward force acting on the device attached to the clip may thereby be reduced. Arranging the hook parts on opposite sides of the main part further allows the main part to be arranged on opposite sides of two parallel, such as adjacent, straps of the load bearing webbing. The outwards movement of the main part of the clip when a force is applied to a device mounted on the clip can thus be limited by the strap arranged on the outside of the main part of the clip. This prevents the main part of the clip to bend out of shape and deform due to an applied outward force acting on the device mounted on the clip.

In one or more example clips, the main part comprises a first main part, a second main part and an intermediate part. The first main part may be offset from the second main part in a direction perpendicular to the first surface and/or the second surface of the main part, such as the second main part. In one or more example clips, the intermediate part connects the first main part and the second main part. The intermediate part may be arranged between the first hook part and the second hook part.

In one or more example clips, the first main part is offset from the second main part, such as in the direction perpendicular to the first surface and/or the second surface, towards the second front. In one or more example clips, the second main part is offset, such as in the direction perpendicular to the first surface and/or the second surface, towards the first front.

In one or more example clips, the first front overlaps with the entire length of the first main part. The length of the main part may be selected to cover two adjacent straps of a load bearing webbing, such as of a PALS webbing. In one or more example clips, the length of the main part is in the range of 75-90 mm, such as in the range of 79-82 mm, such as 80 mm. In one or more example clips, the first front does not overlap with the intermediate part. By increasing the length of the first hook part, the risk of the clip losing its connection with the first strap may be reduced. By the first front not overlapping with the intermediate part of the main part, it can be ensured that a strap can easily be inserted between the first hook end and the second main part of the clip, without having to manually separate the first front of the first hook part and the second main part from each other. This facilitates the mounting of the clip to a strap of the load bearing platform, such as to a PALS webbing. By making the second front of the second hook part shorter than the first front of the first hook part, mounting the clip 1 to a PALS webbing is facilitated, since the strap retained by the second hook part has to be pulled over a shorter distance to be caught by the second hook part.

In one or more example clips, the first front is offset from the second hook in a longitudinal direction of the clip and is not overlapping with the second front, such as in the longitudinal direction.

In one or more example clips, the first front, the second front and/or the main part has a tapered end in a longitudinal direction of the clip.

In one or more example clips, the first hook part is configured to releasably retain a first strap of the plurality of straps, such as to a first strap of a grid of a load bearing webbing, such as a first PALS strap.

In one or more example clips, the second hook part is configured to releasably retain a second strap of the plurality of straps, such as to a second strap of a grid of a load bearing webbing, such as a second PALS strap. In one or more example methods, the second strap is arranged adjacent to the first strap on the load bearing webbing, such as on the PALS webbing.

In one or more example clips, the main part comprises through-going holes configured to receive a fastener for securing the clip to the device to be secured to the plurality of straps. The fastener may be one or more of a screw, a bolt, a pin and a rivet. The through-going holes may have a diameter in the range of 2.5 to 3 mm, such as 2.7 mm.

In one or more example clips, the clip comprises cut-outs arranged between the mounting part of the main part and the first hook end and/or between the mounting part of the main part and the second hook end. The cut-outs may reduce the weight of the clip and thus the weight that a person carrying the PALS system has to carry.

In one or more example clips, the clip is a Modular Lightweight Load-carrying Equipment (MOLLE) clip. The MOLLE clip may be configured to be arranged on a PALS webbing.

The clip may be made of a sheet material, such as of a sheet metal. A sheet material herein means a thin flat piece of material, such as a piece of material having a substantially smaller thickness than a length and a width. The sheet material may be cut and bent into the shape of the clip. The sheet material may have a thickness of 0.8-1.2 mm.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 illustrates an example clip 1 for removably securing a device to a plurality of straps. The clip 1 comprises a main part 10 having a first surface 11 and an opposite second surface (not shown in FIG. 1), a first main part end 13 and a second main part end 14. The main part 10 comprises a mounting part 15 configured to mount the clip 1 to a device, such as to a holster, a magazine pouch, a radio pouch, a knife sheath, and/or other gear, to be secured to the plurality of straps. The clip 1 comprises a first hook part 20 arranged at the first main part end 13 of the clip 1. The first hook part 20 comprises a first hook end 21, a first bend 20A and a first front 20B. A hook part herein means a piece of material curved or bent back at an angle, for catching hold of or hanging things on. The first front 20B is arranged between and connects a first end of the first bend 20A with the first hook end 21. A second end of the first bend 20A is connected to the main part 10, 10A of the clip. The main part 10, 10A may thereby constitute a shank of the first hook part 20. The first front 20B and/or the first hook end 21 is arranged on a first side of the main part 10. The clip 1 comprises a second hook part 30 arranged at the second main part end 14 of the clip 1. The second hook part 30 comprises a second hook end 31, a second bend 30A and a second front 30B. The second front 30B is arranged between and connects a first end of the second bend 30A with the second hook end 31. A second end of the second bend 30A is connected to the main part 10, 10B of the clip. The main part 10, 10B may thereby constitute a shank of the second hook part 30. The second front 30B and/or the second hook end 31 is arranged on a second side of the main part 10 opposite the first side. The first front 20B overlaps with less than or equal to 75% of a length of the main part 10 and the second front 30B overlaps with less than or equal to 25% of the length of the main part 10. The length herein means the extension in a longitudinal direction of the clip 1, such as in a direction extending from the first main part end 13 to the second main part end 14 of the main part 10. The length of the main part may be selected to cover two adjacent straps of a load bearing webbing, such as of a PALS webbing. In one or more example clips, the length of the main part is in the range of 75-90 mm, such as in the range of 79-82 mm, such as 80 mm. In one or more example clips, a length of the first front of the first hook part may be in the range of 0.1 L-0.7 L, such as in the range of 0.2-0.5 L, where L is the length of the main part. In one or more example clips, the length of the first front may be in the range of 8-60 mm, such as in the range of 20-40 mm, such as in the range of 25-35 mm, such as in the range of 29-31 mm. In one or more example clips, a length of the second front of the second hook part may be in the range of 0.05 L-0.25 L, such as in the range of 0.1-0.2 L. In one or more example clips, the length of the second front may be in the range of 4-20 mm, such as in the range of 7-15 mm. The first hook part 20 may be configured to be arranged on a first side of a first strap of the load bearing webbing, such as on an inside of the strap when the load bearing webbing is worn by a user. The second hook part 30 may be configured to be arranged on a second side of a second strap of the load bearing webbing, such as on an outside of the strap when the load bearing webbing is worn by the user. The clip 1 is configured to receive the straps in the first gap between the main part 10, 10A and the first hook part 20 and in the second gap between the main part 10, 10B and the second hook part 30. The main part 10 may thus be arranged on the second side, such as on the outside, of the first strap and on the first side, such as on the inside, of the second strap of the load bearing webbing. The movement of the second main part end of the clip when a force is applied to a device mounted on the clip 1 can thus be limited by the second strap being arranged on the outside of the main part of the clip 1.

In the example clip 1 of FIG. 1, the first front 20B extends parallel to the first surface 11, such as of the first surface of the main part 10. The first hook part 20 may be bent towards the first surface 11, such that the first front 20B faces the first surface 11 of the main part 10. A first gap is thus created between the first surface of the main part and the first front of the first hook part for receiving a first strap. The first gap has a first throat, such as a distance from the first hook end to a centre of the first bend of the first hook. In one or more example clips 1, the second front 30B extends parallel to the second surface 12. The second hook part 30 may be bent towards the second surface 12, such that the second front 30B faces the second surface 12 of the main part 10. A second gap is thus created between the second surface of the main part and the second front of the second hook part for receiving a second strap. The second gap has a second throat, such as a distance from the second hook end to a centre of the second bend of the second hook. In other words, the first hook part 21 and the second hook part 31 are facing opposite surfaces 11, 12 of the main part.

In the example clip shown in FIG. 1, the main part 10 comprises a first main part 10A, a second main part 10B and an intermediate part 10C. The intermediate part 10C connects the first main part 10A and the second main part 10B. The intermediate part 10C is arranged between the first hook part 20 and the second hook part 30. The first main part 10A is offset from the second main part 10B in a direction perpendicular to the first surface 11 and/or the second surface 12 of the main part 10.

In the example clip shown in FIG. 1, the first main part 10A is offset from the second main part, such as in the direction perpendicular to the first surface 11 and/or the second surface 12, towards the second front 30B. In one or more example clips, the second main part 10B is offset from the first main part, such as in the direction perpendicular to the first surface 11 and/or the second surface 12, towards the first part 20B.

In the example clip shown in FIG. 1, the first front 20B is offset from the second hook in a longitudinal direction of the clip 1 and is not overlapping with the second front 30B, such as is not overlapping in the longitudinal direction. The first hook part 20 is configured to releasably retain a first strap of the plurality of straps, such as to a first strap of a grid of the load bearing webbing, such as a first PALS strap. The second hook part 30 is configured to releasably retain a second strap of the plurality of straps, such as to a second strap of the grid of the load bearing webbing, such as a second PALS strap. In one or more example methods, the second strap is arranged adjacent to the first strap on the load bearing webbing, In the example clip shown in FIG. 1, the main part 10 comprises through-going holes 16 configured to receive a fastener for securing the clip 1 to the device to be secured to the plurality of straps. The fastener may be one or more of a screw, a bolt, a pin and a rivet.

In the example clip shown in FIG. 1, the clip 1 comprises cut-outs 17 arranged between the mounting part 15 of the main part 10 and the first hook end 21 and/or between the mounting part 15 of the main part 10 and the second hook end 31. By providing cut-outs 17 in the clip 1 the weight of the clip, and thus the weight that a person carrying the PALS system has to carry, can be reduced. The cut-outs 17 may in one or more example clips be arranged in one or more of the main part 10, the first main part 10A, the second main part 10B, the intermediate part 10C, the first hook part 20, such as in the first bend 20A and/or the first front 20B, and the second hook part 30, such as in the second bend 30A and/or in the first front 30B.

Figure 2:
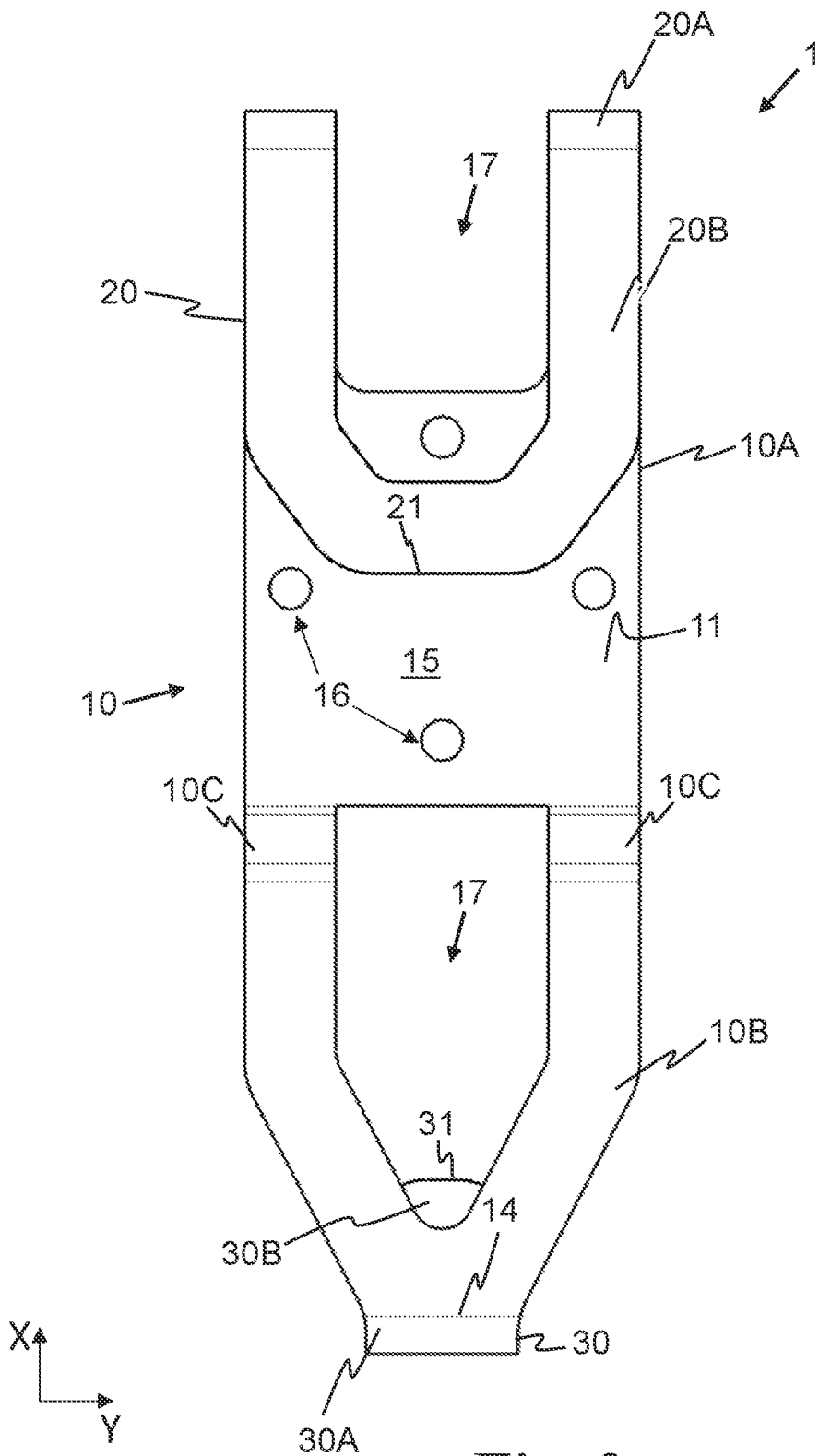
FIG. 2 illustrates the example clip according to this disclosure seen from a first side view.

FIG. 2 illustrates the example clip of FIG. 1 seen from a first side view, such as seen in the direction of the first surface 11. In the example clip shown in FIG. 2, the first front 20B, the second front 30B and the second main part 10B have tapered ends in a longitudinal direction of the clip 1. Having a tapered end in the longitudinal direction herein means that the width decreases towards the first hook end 31, the second hook end 31 and/or the main part end 14. The width herein is an extension of the clip along the axis Y in FIG. 2. By making the first front 20B and/or the second front 30B tapered in the longitudinal direction insertion of the first hook part 20 and/or the second hook part 30 into a load bearing webbing of straps, such as into a PALS webbing, can be facilitated. The maximum width of the clip 1 may correspond to a distance between two sewing points of a strap of a PALS system. In one or more example clips, the maximum width of the clip may be in the range of 20-38 mm, such as in the range of 28-24 mm, such as 26 mm.

In the example clip shown in FIG. 2, the clip 1 comprises cut-outs 17 arranged between the mounting part 15 of the main part 10 and the first hook end 21, such as in the first main part 10A and/or in the first hook part 21. In the example clip shown in FIG. 2, the clip 1 comprises cut-outs 17 arranged between the mounting part 15 of the main part 10 and the second hook end 31, such as in the second main part 10B and/or in the second hook part 30. By providing cut-outs 17 in the clip 1 the weight of the clip, and thus the weight that a person carrying the PALS system has to carry, can be reduced. By providing cut-outs in the first hook part 20, access can be provided to the through going holes 16 arranged in the mounting part 15 of the main part 10 for inserting a fastener for securing the clip 1 to a device into the through-going hole otherwise covered by the first hook part 20.

Figure 3:
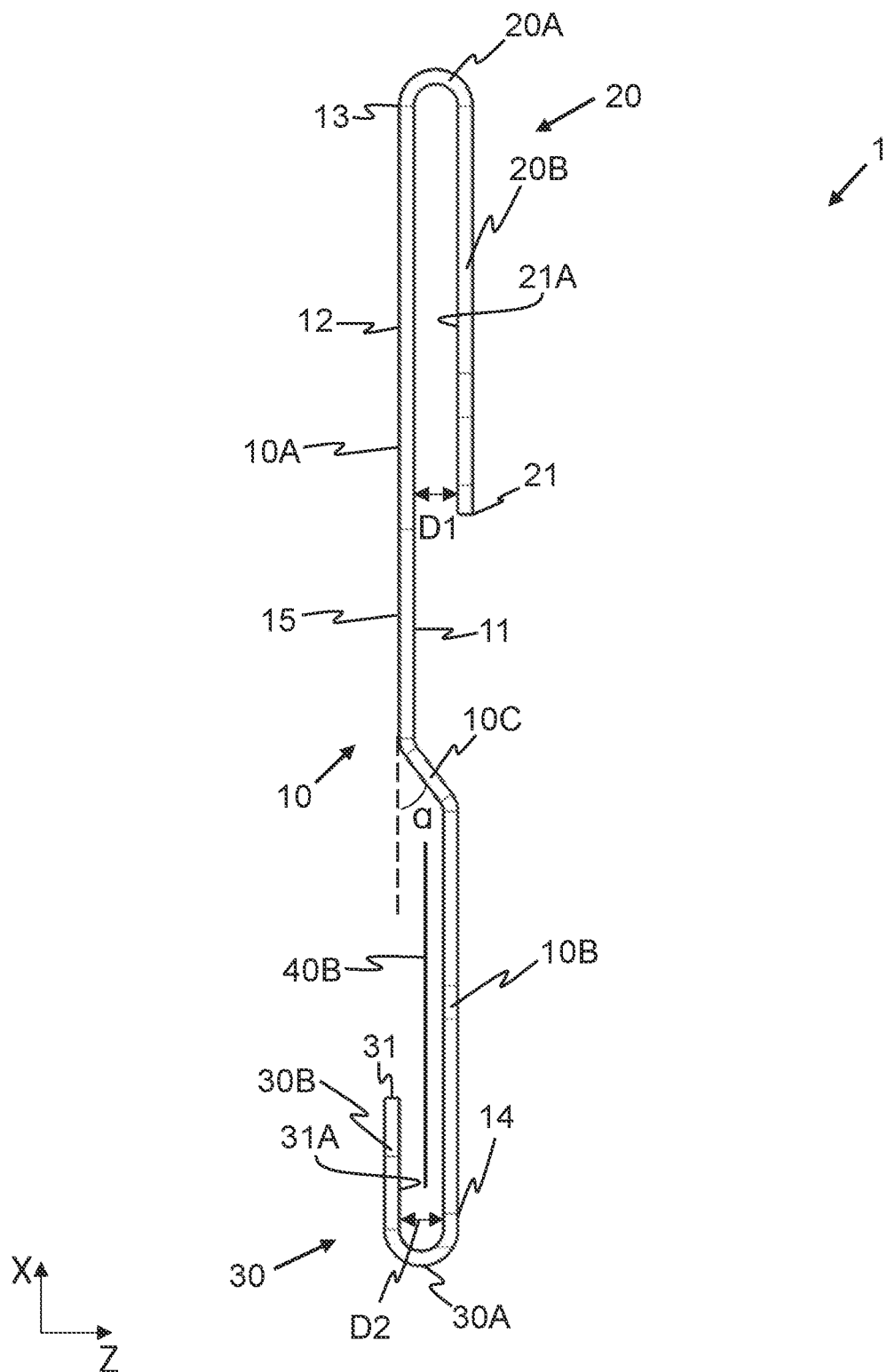
FIG. 3 illustrates a cross-sectional view of the example clip according to this disclosure.

FIG. 3 illustrates a cross-sectional view of the example clip 1 according to FIGS. 1 and 2. As can be seen in FIG. 3 the main part 10 of the example clip 1 has a first surface 11 and an opposite second surface 12. The main part 10 further comprises the first main part 10A, the second main part 10B and the intermediate part 10C. The first main part 10A is offset from the second main part 10B in a direction perpendicular to the first surface 11 and/or the second surface 12 of the main part 10. In the example clip of FIG. 3, the first main part 10A is offset towards the second front 30B along the axis Z shown in FIG. 3, such that the second front 30B and the first main part 10A are arranged substantially in a same longitudinal plane. Correspondingly, the second main part 10B is offset towards the first front 30B along the axis Z, such that the first front 20B and the second main part 10B are arranged substantially in a same longitudinal plane. In one or more example clips, the first main part may be offset from the second main part 10B by a distance in the range of 2-5 mm, such as by 3 mm. In the example clip 1 of FIG. 3, the intermediate part 10C is arranged at an angle cc to the first surface 11 and/or the second surface 12 of the clip 1 to cover the offset distance between the first main part 10A and the second main part 10B. The angle cc may be different than 0°. In one or more example clips, the clip 1 may thus have an S-shape. By offsetting the first main part 10A from the second main part 10B, the second main part 10B may be arranged on an opposite side of a strap 40A, 40B of a load bearing webbing than the first main part 10A without having to twist the straps or arrange the clip at an angle to the straps. In other words, a first strap 40A retained between the first hook part 21 and the first main part 10A and a second strap 40B retained between the second hook part 31 and the second main part 10A can be positioned in a same plane in the longitudinal direction. This prevents the load bearing webbing from twisting and thus increases the comfort of the user of the load bearing webbing. Furthermore, by offsetting the first main part 10A from the second main part 10B, such that the second front 30B and the first main part 10A are arranged substantially in the same longitudinal plane, the second hook part 30 does not interfere with a device mounted to the mounting part 15 on the second surface of the main part 10.

As can be seen in FIG. 3, the first hook part 20, such as the first bend 20A, is arranged at the first main part end 13 and the front 20B and/or the first hook end 21 of the first hook part 20 is arranged on a first side of the main part 10, such that the first front 20B faces the first surface 11 of the main part 10. The first front 20B overlaps with less than or equal to 75% of the length of the main part 10. In the example clip shown in FIG. 3, the first front 20B does not overlap with the intermediate part 10C of the main part 10 of the clip 1. Thereby, a gap is provided between the first hook end 21 and the second main part 10B allowing the strap to be inserted between the first hook end 21 and the second main part 10B.

The second hook part 30 is arranged at the second main part end 14 of the clip 1. The second hook end 31 is arranged on the second side of the main part 10 opposite the first side, such as facing the second surface 12 of the main part 10. The second hook end 31 overlaps with less than or equal to 25% of the length of the main part 10. In the example clip shown in FIG. 3, the second hook end 31 does not overlap with the intermediate part 10C of the main part 10 of the clip 1. The length of the clip herein means the extension in a longitudinal direction of the clip 1, such as in a direction extending from the first main part end 13 to the second main part end 14 of the main part 10, such as along the longitudinal axis X.

In the example clip shown in FIG. 3, the first front 20B extends parallel to the first surface 11, such as of the first surface of the main part 10. The first hook part 20 may be bent towards the first surface 11, such that a first surface 21A of the first front 20B faces the first surface 11 of the main part 10, such as of the first main part 10A. The first front 20B may be arranged at a first distance D1 from the first main part 10A of the clip. The distance D1 thus creates a first gap between the first surface 11 of the main part 10, 10A and the first front 20B of the first hook part 20 for receiving a first strap. The first hook part 20 further has a first throat, such as a distance from the first hook end 21 to a point of the first bend 20B being furthest away from the first hook end 21 in the longitudinal direction X. The first gap and the first throat thus create a first confined space configured to receive the first strap. The first distance D1 may be selected to accommodate the strap of the load bearing webbing. In one or more example clips, the first distance D1 is in the range of 2.5-5 mm. In one or more example clips 1, the second front 30B extends parallel to the second surface 12 of the main part 10. The second hook part 30 may be bent towards the second surface 12, such that a first surface 31A of the second front 30B faces the second surface 12 of the main part 10, such as of the second main part 10B. The second front 30B may be arranged at a second distance D2 from the second main part 10B of the clip. The distance D2 thus creates a second gap between the second surface 12 of the main part 10, 10B and the second front 30B of the second hook part 30, for receiving a second strap. The second hook part 30 has a second throat, such as a distance from the second hook end 31 to a point of the second bend 30B being furthest away from the second hook end 31 in the longitudinal direction X. The second gap and the second throat thus create a second confined space configured to receive the second strap. The second distance D2 may be selected to accommodate the strap 40B of the load bearing webbing. In one or more example clips, the second distance D2 is in the range of 2.5-5 mm. The second distance D2 may be equal to or different than the first distance D1.

In the example clip shown in FIG. 3, the first main part 10A is offset, such as in the direction perpendicular to the first surface 11 and/or the second surface 12, towards the second hook end 31. In one or more example clips, the second main part 10B is offset, such as in the direction perpendicular to the first surface 11 and/or the second surface 12, towards the first hook end 21.

In the example clip shown in FIG. 3, the first front 20B and/or the first hook end 21 is offset from the second front 30B and/or the second hook end 31 in a longitudinal direction of the clip 1 and is not overlapping with the second front 30B and/or second hook end 31, such as is not overlapping with the second front 30B and/or second hook end 31 in the longitudinal direction.

Figure 4:
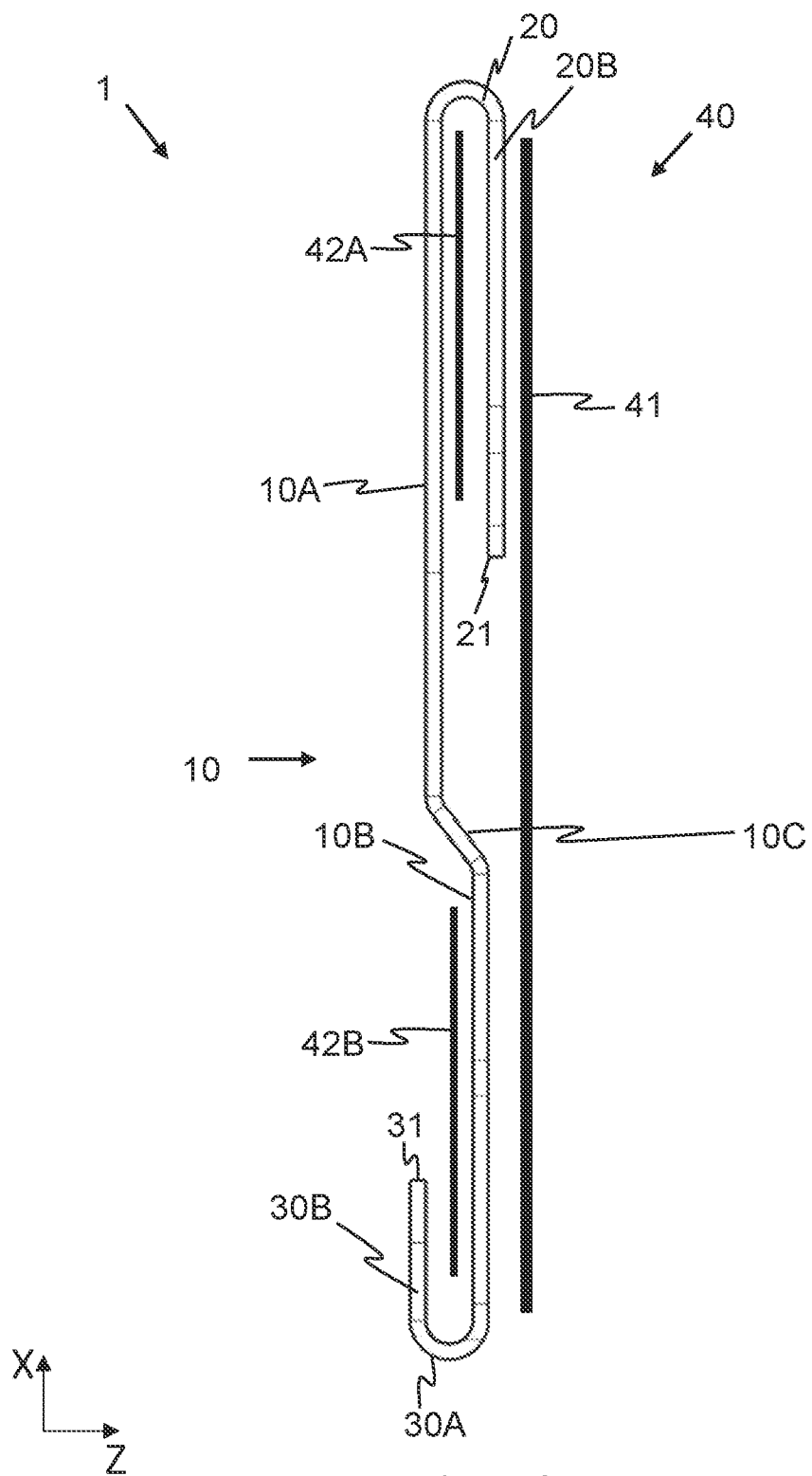
FIG. 4 illustrates a side view of the example clip mounted to a load bearing webbing according to this disclosure.

FIG. 4 illustrates a side view of the example clip 1 mounted on a load bearing webbing 40, such as a PALS webbing. The load bearing webbing 40 comprises a base plate 41 and a plurality of straps, such as a first strap 42A and a second strap 42B. The first hook part 20, such as the first hook end 21 is configured to be arranged between the base plate 41 and the first strap 42A. The first hook part 20, such as the first front 20B and/or the first hook end 21, may thus be configured to be arranged on a first side of the first strap 42A of the load bearing webbing 40, such as on the inside of the strap, when the load bearing webbing 40 is worn by a user. The inside of the strap herein means the side of the strap facing the base plate 41 of the load bearing webbing 40. The second hook part 30, such as the second front 30B and/or the second hook end 31, may be configured to be arranged on a second side of a second strap of the load bearing webbing 40, such as on the outside of the strap when the load bearing webbing 40 is worn by the user. The outside of the strap herein means the side of the strap facing away from the base plate 41 of the load bearing webbing 40. The clip 1 is configured to receive the straps 42A, 42B between the main part 10 and the first hook part 20 and the second hook part 30. The first main part 10A of the clip may thus be configured to be arranged on the second side, such as on the outside, of the first strap 42A and on the first side, such as on the inside, of the second strap 42B of the load bearing webbing 40. The movement of the second main part 10B of the clip when a force is applied to a device mounted on the clip 1 can thus be limited by the second strap 42B being arranged on the outside of the second main part 10B of the clip 1, thereby reducing the risk of the clip 1 bending out of shape and/or deforming.

Figure 5:
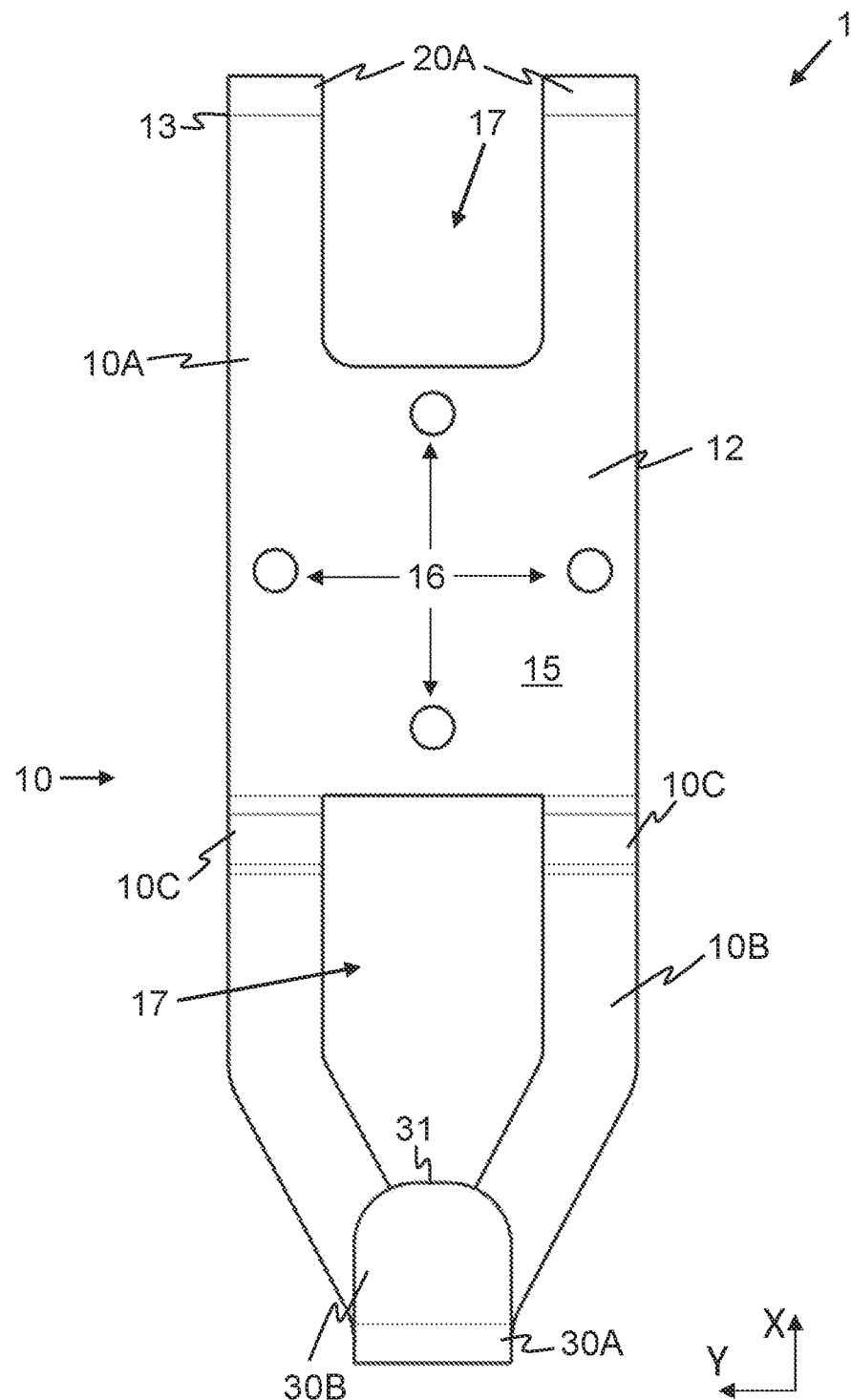
FIG. 5 illustrates the example clip according to this disclosure seen from a second side view.

FIG. 5 illustrates the example clip according to FIGS. 1-4 seen from a second side view facing the second surface 12 of the clip 1. The mounting part 15 is configured to receive a device to be secured to the plurality of straps on the second surface 12. By mounting the device to be secured to the second surface 12 of the main part 10, such as on the opposite side of the main part 10 compared to the first hook part 20, the mounted device does not interfere with the first hook part 20. Thereby, mounting of the device to the clip 1 and/or mounting of the clip 1 to the strap of the webbing is facilitated.

Figure 6:
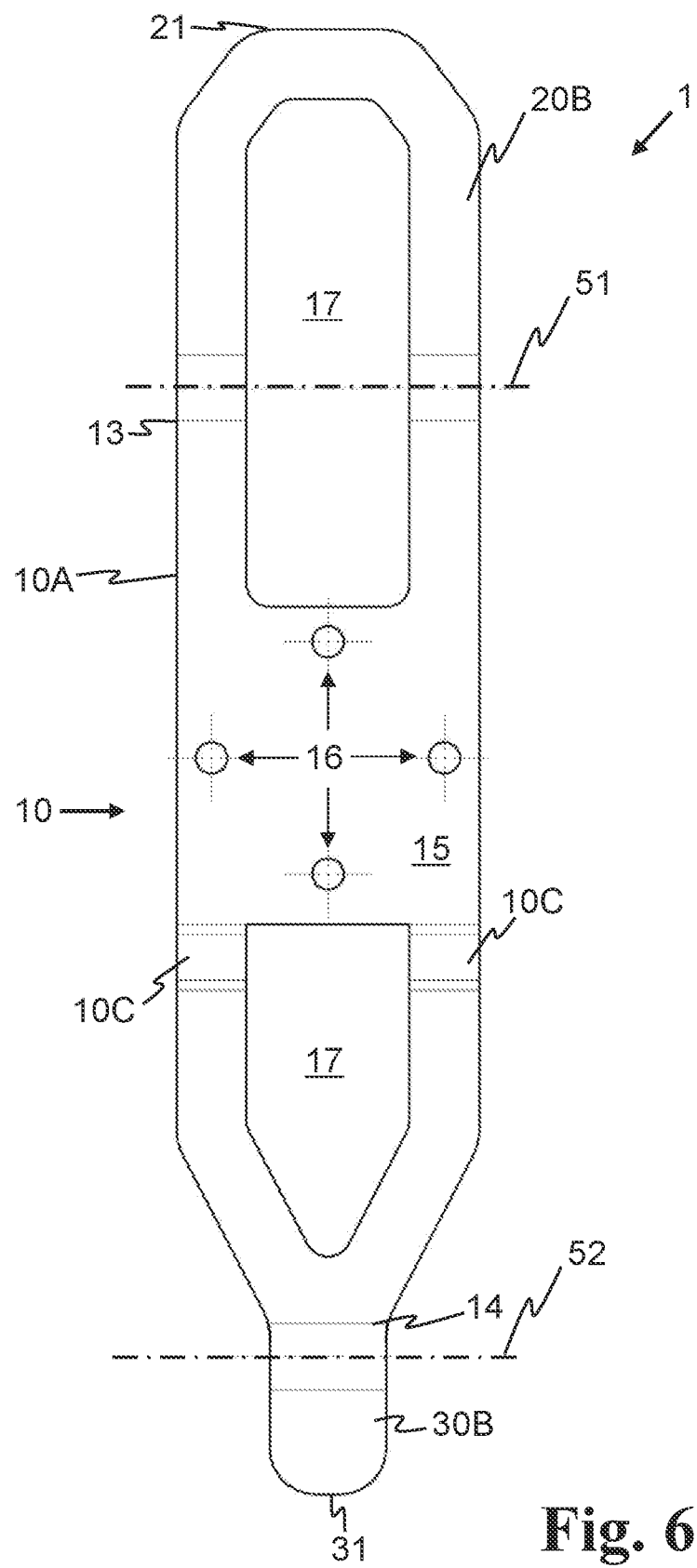
FIG. 6 illustrates the example clip according to this disclosure in a non-folded state.

FIG. 6 illustrates the clip 1 according to this disclosure in a non-folded state, such as in an intermediate state during a manufacturing process of the clip. The clip 1 may be manufactured out of a single sheet material. The cut-outs 17 and the through going holes 16 as well as the outline of the clip 1 may be stamped, cut and/or drilled out of the sheet material. Thereafter, the first hook part 20 may be created by bending the sheet material in a first direction along a first bend line 51, such as until the first front 20B and/or the first hook end 21 is arranged in parallel to the first surface 11 of the clip 1. The second hook part 30 may be created by bending the sheet material in a second direction along the second bend line 52, such as until the second front 30B and/or the second hook end 31 is arranged in parallel to the second surface 12 of the clip 1. In one or more example methods, the clip 1 is deburred and/or the edges of the clip 1 are dulled.

It shall be noted that the features mentioned in the embodiments described in FIGS. 1-6 are not restricted to these specific embodiments.

Embodiments of products (clip) according to the disclosure are set out in the following items:

Item 1. A clip (1) for removably securing a device to a plurality of straps, the clip (1) comprising:
a main part (10) having a first surface (11) and an opposite second surface (12), a first main part end (13) and a second main part end (14), the main part (10) comprising a mounting part (15) configured to mount the clip (1) to a device to be secured to the plurality of straps,
a first hook part (20) arranged at the first main part end (13), the first hook part (20) comprising a first front (20B), the first front (20B) arranged on a first side of the main part (10),
a second hook part (30) arranged at the second main part end (14), the second hook part (30) comprising a second front (30B), the second hook end (31) arranged on a second side of the main part (10) opposite the first side,
wherein the first front (20B) overlaps with less than or equal to 75% of a length of the main part (10) and the second front (30B) overlaps with less than or equal to 25% of the length of the main part (10).

Item 2. The clip (1) according to Item 1, wherein the first front (20B) extends parallel to the first surface (11).

Item 3. The clip (1) according to any one of the previous Items, wherein the second front (30B) extends parallel to the second surface (12).

Item 4. The clip (1) according to any one of the previous Items, wherein the main part (10) comprises a first main part (10A), a second main part (10B) and an intermediate part (10C), the first main part (10A) being offset from the second main part (10B) in a direction perpendicular to the first surface (11) and/or the second surface (12), and the intermediate part (10C) connecting the first main part (10A) and the second main part (10B).

Item 5. The clip (1) according to Item 4, wherein the intermediate part (10C) is arranged between the first hook part (20) and the second hook part (30).

Item 6. The clip (1) according to Items 4 or 5, wherein the first main part (10A) is offset from the second main part (10B) in a direction perpendicular to the second surface (12) towards the second front (30B) and the second main part (10B) is offset from the first main part (10A) in a direction perpendicular to the first surface (12) towards the first front (20B).

Item 7. The clip (1) according to any one of the previous Items, wherein the first front (20B) is offset from and not overlapping with the second front (30B) in a longitudinal direction of the clip (1).

Item 8. The clip (1) according to any one of the previous Items, wherein one or more of the first front (20B), the second front (30B), and the main part (10) has a tapered end in a longitudinal direction of the clip (1).

Item 9. The clip (1) according to any one of the previous Items, wherein the first hook part (20) is configured to releasably retain a first strap of the plurality of straps.

Item 10. The clip (1) according to any one of the previous Items, wherein the second hook part (30) is configured to releasably retain a second strap of the plurality of straps.

Item 11. The clip (1) according to any one of the previous Items, wherein the main part (10) comprises through-going holes (16) configured to receive a fastener for securing the clip (1) to the device to be secured to the plurality of straps.

Item 12. The clip (1) according to any one of the previous Items, wherein the clip (1) comprises cut-outs (17) arranged between the mounting part (15) of the main part (10) and the first hook end (21) and/or between the mounting part (15) of the main part (10) and the second hook end (31).

Item 13. The clip (1) according to any one of the previous Items, wherein the clip (1) is a Modular Lightweight Load-carrying Equipment, MOLLE, clip.

Item 14. The clip (1) according to any one of the previous Items, wherein the strap is a Pouch Attachment Ladder System, PALS, strap.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

LIST OF REFERENCES 1 clip
10 main part
10A first main part
10B second main part
10C intermediate part
11 first surface of main part
12 second surface of main part
13 first main part end
14 second main part end
15 mounting part
16 through-going hole
17 cut-out
20 first hook part
20A first bend
20B first front
21 first hook end
30 second hook part
30A second bend
30B second front
31 second hook end
40 load bearing webbing
41 base plate
42A first strap
42B second strap
51 first bend line
52 second bend line

The invention claimed is:

1. A clip for removably securing a device to a plurality of straps, the clip comprising:
a main part comprising a first main part, a second main part, and an intermediate part between the first main part and the second main part, the main part configured to couple to the device;
a first hook part at a first end of the main part, the first hook part comprising a first front facing towards a first surface of the main part; and
a second hook part at a second end of the main part, the second hook part comprising a second front facing towards a second surface of the main part, the second surface being opposite from the first surface;
wherein the first front of the first hook part overlaps with less than or equal to 75% of a length of the main part, wherein the second front of the second hook part overlaps with less than or equal to 25% of the length of the main part; and
wherein the first main part comprises a plurality of first members connected to the first hook part, and wherein the second main part comprises a plurality of second members connected to the second hook part.

2. The clip according to claim 1, wherein the first main part and the second front of the second hook part are both offset from the second main part in a first direction perpendicular a plane of the second main part, and wherein the second main part and the first front of the first hook part are both offset from the first main part in a second direction perpendicular to a plane of the first main part.

3. The clip according to claim 1, wherein the first front extends parallel to the first surface.

4. The clip according to claim 1, wherein the second front extends parallel to the second surface.

5. The clip according to claim 1, wherein the intermediate part is between the first hook part and the second hook part.

6. The clip according to claim 1, wherein the first front of the first hook part is offset from and not overlapping with the second front of the second hook part in a longitudinal direction of the clip.

7. The clip according to claim 1, wherein one or more of the first front, the second front, and the main part has a taper configuration.

8. The clip according to claim 1, wherein the first hook part is configured to releasably retain one of the plurality of straps.

9. The clip according to claim 1, wherein the second hook part is configured to releasably retain one of the plurality of straps.

10. The clip according to claim 1, wherein the first hook part is configured to releasably retain one of the plurality of straps, and the second hook part is configured to releasably retain another one of the plurality of straps.

11. The clip according to claim 1, wherein the main part comprises a through-going hole configured to receive a fastener for securing the clip to the device.

12. The clip according to claim 1, wherein the main part comprises a mounting part configured to couple to the device, and wherein the clip comprises a first cut-out between the mounting part of the main part and a first hook end of the first hook part.

13. The clip according to claim 12, wherein the clip also comprises a second cut-out between the mounting part of the main part and a second hook end of the second hook part.

14. The clip according to claim 1, wherein the main part comprises a mounting part configured to couple to the device, and wherein the clip also comprises a cut-out between the mounting part of the main part and a hook end of the second hook part.

15. The clip according to claim 1, wherein the clip is integratable as a part of a Modular Lightweight Load-carrying Equipment (MOLLE).

16. The clip according to claim 1, wherein the clip is integratable as a part of a Pouch Attachment Ladder System (PALS).

17. The clip according to claim 1, wherein the main part, the first hook part, and the second hook part are integral with respect to each other.

18. The clip according to claim 1, wherein the main part, the first hook part, and the second hook part are formed from a single planar structure.

19. A clip for removably securing a device to a plurality of straps, the clip comprising:
a main part comprising a first main part, a second main part, and an intermediate part between the first main part and the second main part, the main part configured to couple to the device;
a first hook part at a first end of the main part, the first hook part comprising a first front facing towards a first surface of the main part; and
a second hook part at a second end of the main part, the second hook part comprising a second front facing towards a second surface of the main part, the second surface being opposite the first surface;

wherein the first main part and the second front of the second hook part are both offset from the second main part in a first direction perpendicular a plane of the second main part, and wherein the second main part and the first front of the first hook part are both offset from the first main part in a second direction perpendicular to a plane of the first main part.

20. The clip according to claim 19, wherein the first front of the first hook part overlaps with less than or equal to 75% of a length of the main part.

21. The clip according to claim 19, wherein the second front of the second hook part overlaps with less than or equal to 25% of the length of the main part.

22. The clip according to claim 19, wherein the first main part comprises a plurality of first members connected to the first hook part, and wherein the second main part comprises a plurality of second members connected to the second hook part.

* * * * *